United States Patent Office 2,921,913
Patented Jan. 19, 1960

2,921,913
SILICA ORGANOSOLS

Guy B. Alexander, Brandywine Hundred, Del., assignor to E. I. du Pont de Nemours and Company, Wilmington, Del., a corporation of Delaware No Drawing. Application May 1, 1956
Serial No. 581,842

2 Claims. (Cl. 252—309)

This invention relates to organosols of alkali-stabilized colloidal silica in polyhydric alcohols and to processes for producing such sols, and is more particularly directed to stable organosols having a silica content of 10 to 60 percent and a relative viscosity, as measured at 5% $SiO_2$, below 1.9 and comprising substantially non-aggregated, amorphous, dense, spherical silica particles 5 to 130 millimicrons in diameter, colloidally dispersed in a polyhydric alcohol completely miscible with water, the sol preferably being stabilized with enough of an alkali of the class consisting of water-soluble monovalent metal silicates and basic hydroxides of monovalent anions to give an $SiO_2:M_2O$ mol ratio greater than 20D:1 and preferably in the range of 300D:1 to 50D:1, where D is the average particle diameter in millimicrons and M is a monovalent cation such as an alkali metal, ammonium or substituted ammonium cation, and is further directed to processes for producing such organosols comprising subjecting an aquasol of silica particles of the character described to contact with an anion- and a cation-exchange resin until the sol is completely deionized, adding an alkali of the class consisting of water-soluble monovalent metal silicates and basic hydroxides of monovalent cations until the $SiO_2:M_2O$ ratio is greater than 20D:1 and preferably in the range of from 300D:1 to 50D:1, mixing the so-treated aquasol with a polyhydric alcohol completely miscible with water, in an aquasol:alcohol volume ratio of from 1:1 to 1:5, and removing water from the mixture by distillation.

The problem to which the present invention provides an answer is that of producing organosols of silica particles 5 to 130 millimicrons in diameter which are concentrated enough to ship and use in industry on an economical basis and which are stable enough that they can be used after extended periods of storage. Many methods have been proposed in which a freshly prepared silica sol, made as by neutralizing sodium silicate with an acid, is mixed with an organic solvent and heated, but in such compositions the silica initially has a molecular weight so low that the individual silica particles are much smaller than 5 millimicrons in diameter. Such low molecular weight silica particles are extremely active and show a marked tendency to grow in size and to chain together and form masses of silica gel. When such silica aquasols are mixed with glycols or other polyhydric alcohols the result is usually instantaneous gelation.

Aquasols in which the size of the ultimate silica particles has been increased to more than 5 millimicrons by heat treatments, build-up with active silica, or other methods, have recently become available. When it is attempted to prepare silica organosols by merely adding to such sols organic solvents and distilling out the water difficulty is encountered in that the sols become viscous and tend to gel. Efforts have been made, as in U.S. Patent 2,375,738, issued May 8 to John F. White, to avoid such instability by maintaining the pH no higher than 7.5 while removing water from such a silica aquasol-organosol mixture. However, at various pH values below 7.5 silica sols are in a metastable state and readily gel or precipitate. In any event, the preparation of stable, concentrated organosols by such prior methods has not hitherto been practicable.

Now according to the present invention it has been found that silica organosols which are both concentrated enough and stable enough to be commercially practicable can be produced by removing anions and cations from a silica aquasol containing non-aggregated, amorphous, dense, spherical silica particles 5 to 130 millimicrons in diameter, adding an alkali which is a water soluble, monovalent metal silicate or a basic hydroxide of a monovalent cation until the $SiO_2:M_2O$ mol ratio is greater than 20D:1 and preferably in the range from 300D:1 to 50D:1, D being the average silica particle diameter and M being a monovalent cation such as an alkali metal, ammonium, or substituted ammonium cation, mixing the treated aquasol with a polyhydric alcohol which is completely miscible with water, in an aquasol: alcohol volume ratio of from 1:1 to 1:5, and removing water from the mixture by distillation. It has been found that stable organosols having a relative viscosity, as measured at 5% $SiO_2$, below 1.9, can thus be prepared.

The organosols of the present application, when evaporated to dryness, produce hydrophilic silica powders which are not redispersible in the organic solvent from which they are prepared. They are not to be confused with products in which surface hydroxyl groups on the silica have been combined with organic groups of a type and in a manner to make the surface of the particles hydrophobic. Neither are the products to be confused with supercolloidal silica aggregates which have been surface-esterified as aggregates, since in the compositions of the present invention any surface esterification occurs upon the surface of discrete silica particles in the size range of 5 to 130 millimicrons.

The art is already familiar with various methods for making silica aquasols containing particles in the range of 5 to 130 millimicrons and any of these methods can be used for making the starting material for a process of this invention. It is noted that methods in which steps are not taken to grow the size of the silica particles up to 5 millimicrons do not give sols of the type required and are to be avoided. Sols of particles near the lower end of the desired size range can be prepared by bringing a dilute sodium silicate solution into contact with a cation-exchange resin to obtain an effluent containing about 3% $SiO_2$ and evaporating water from this sol to a silica concentration of about 6 percent. Sols in which the ultimate particles have been increased in size can also be made by processes of the above-mentioned White Patent 2,375,738 wherein a precipitated and washed silica gel is heated in an autoclave with water at elevated temperature. The particles in such sols have a tendency to be aggregated and hence are not preferred. Alternatively, a process of Trail U.S. Patent 2,573,743 can be used, wherein a solution of ionic silica is added to a silica sol, the mixture is heated, and cations are removed by ion-exchange. Particularly preferred are sols prepared according to Bechtold and Snyder U.S. Patent 2,574,902 in which a heel of silica sol is prepared and additional quantities of silica sol containing active silica are added in such a manner that the silica added builds up on the silica particles already present. Processes of Broge U.S. Patent 2,680,721 can also be used.

Although the size of the non-aggregated, dense silica particles in the silica aquasol can be in the range from 5 to 130 millimicrons in diameter, in particularly preferred compositions the size range is from 10 to 50 millimicrons. This size range refers to the discrete ultimate particles and can be ascertained either by direct examination of the sol under an electron microscope or by calculation from nitrogen adsorption measurements according to techniques with which the art is already familiar.

The particles in the silica aquasol should be substantially discrete—that is, non-aggregated. The freedom from aggregation can be shown by relative viscosity measurements. Thus, the sol, at a concentration of 10% $SiO_2$ and in a completely deionized condition, should have a relative viscosity below 1.9 and preferably in the range of from 1.15 to 1.40.

The silica aquasols for use in the present invention preferably should contain at least 10% silica expressed as $SiO_2$. The silica content preferably is in the range from 10 to 50%, 25 to 40% $SiO_2$ being particularly preferred. However, when operating with extremely small silica particles, namely those in the lower size ranges from, say, 5 to 15 millimicrons, the preferable range is slightly more dilute—namely, in the range from 15 to 25% $SiO_2$.

Having selected a suitable silica aquasol as above described, the sol is subjected to contact with an anion- and a cation-exchange resin until completely deionized. The art is already familiar with techniques for effecting such deionization, the methods described in the above-mentioned Rule Patent 2,577,485 being suitable. As the anion-exchange resin one can use, for example, "Amberlite" IR4B in the hydroxyl form, and as the cation-exchange resin one can use, for example, "Nalcite" HCR in the hydrogen form. The silica sol can be passed downwardly through a column of the mixed resins, or alternatively the sol can first be treated with a cation-exchange resin the hydrogen form and then with an anion-exchange resin in the hydroxyl form. The exchange cycle can be repeated two or more times if desired. Another alternative is to stir the aquasol with a mixture of the anion- and cation-exchange resins. The extent of deionization can be determined by conductivity. The salt content, expressed as percent $Na_2SO_4$ and measured by conductivity, should be less than 0.2 mol percent, based on the $SiO_2$.

After the silica aquasol has been completely deionized as above described it will be substantially free of salts. The specific conductivity of the sol should not exceed about $4 \times 10^{-4}$ mho/cm. Preferably the conductivity will not exceed about $1 \times 10^{-4}$ mho/cm. and if the sol is to be very highly concentrated the specific conductivity should be not more than about $6 \times 10^{-5}$ mho/cm. In this highly deionized condition the sol is in a metastable state; hence it is desirable to proceed immediately to the adjustment of the silica:alkali ratio by adding alkali.

Ratio adjustment is accomplished by adding a suitable quantity of alkali. This alkali is selected from the class consisting of water-soluble monovalent metal silicates and basic hydroxides of monovalent ions. Examples of suitable silicates are lithium, sodium, and potassium silicates. Examples of basic hydroxides of monovalent anions are lithium, sodium, and potassium hydroxides, substituted ammonium hydroxides such as tetramethyl ammonium hydroxide, and ammonium hydroxide. It will be understood that substances such as amines, alkali metal oxides, and carbonates, which react with water to give basic hydroxides, are the full equivalent of the alkalies just mentioned. Alkali metal carbonates can be used if the carbonate can be eliminated as $CO_2$.

The amount of alkali added to the silica sol should be enough to adjust the $SiO_2:M_2O$ mol ratio to a figure greater than 20D:1 and preferably 300D:1 to 50D:1, where D is the silica particle size in millimicrons and M is a monovalent cation such as an alkali metal, ammonium, or substituted ammonium cation. It will be understood that the value "$M_2O$" is merely a convenient expression for stating the molar equivalency of various alkalies and that any base can be expressed in this manner, whether or not it exists as the metal oxide. Thus, if the alkali is sodium hydroxide, $M_2O$ represents $Na_2O$. On the other hand, if the alkali is ammonium hydroxide, $M_2O$ represents the equivalent of $(NH_4)_2O$.

The $SiO_2:M_2O$ ratio after adding the alkali should be preferably in the range from 300D:1 to 50D:1. Since the particle diameter, D, can be in the range of 5 to 100 millimicrons, the ratio for 100 millimicron particles can be 30,000 to 5,000, and for 5 millimicron particles can be 1,500 to 250. It is particularly preferred that the $SiO_2:M_2O$ ratio be in the range of 100D:1 to 50D:1.

The silica aquasol, with suitably adjusted ratio, is mixed with a liquid polyhydric alcohol which is completely miscible with water. Typical of such alcohols, and especially preferred, are di- and tri-hydric alcohols such as ethylene glycol, propylene glycol, and glycerol. Ethylene glycol is particularly preferred.

Enough of the alcohol is added to the aquasol to give a silica-to-alcohol ratio in the range which is desired in the final product. Ordinarily slightly more than this minimum amount will be added. In particular, the aquasol:alcohol volume ratio will be from 1:1 to 1:5. Larger amounts of alcohol can be added but no advantage is gained and the sol is unduly diluted. After addition of the alcohol the pH of compositions having the most preferred $SiO_2:M_2O$ ratio is in the range of 7 to 7.5.

After mixing the aquasol and the alcohol, water is removed by distillation. This distillation is carried out at atmospheric pressure or under reduced pressure. Reduced pressure distillation is preferred, since the sols obtained are more stable. Since preferred alcohols such as ethylene glycol do not form an azeotrope, the water can be removed directly, leaving the desired silica organosol.

Distillation can be carried out in a distilling column having, for example, from 3 to 30 theoretical plate equivalents. During distillation, the system should be agitated, and in the optimum case, the heating surfaces provided should have a temperature only slightly in excess of that of the distilling medium—say, from 10 to 30° C. This is to avoid drying of the organosol on the walls of the equipment. Preferably the distillation is carried out in the absence of oxygen to minimize discoloration.

The distillation is continued until the water content in the organosol is substantially reduced, preferably to less than 10%. In a preferred aspect, the water content is reduced below 0.2% and in a further preferred aspect is substantially 0. Water content is determined by titration with Fisher reagent according to well-known methods.

If the distillation is carried on at a sufficiently high temperature and the water content is brought down to a very low level, esterification of surface silanol groups—that is, SiOH groups on the surface of the silica, occurs, forming ester groups, SiOR, on the surface of the particles. Sols having a low degree of esterification, such as 0 to 2 ester groups per square millimicron of particle surface can be prepared by distilling out only a part of the water, so that the water content is from 0.2 to 10%. Alternatively, such sols can be prepared by distilling out water at a lower temperature—say in the region of 100° C., by using low pressures or partial vacuum during the distillation procedure. On the other hand, by lowering the water content to the range of 0 to 0.2% and refluxing, for instance for ¼ to one hour at a temperature of 200° C., a higher degree of esterification, in the range from 2 to 4 ester groups per square millimicron of particle surface, is obtained. For such degrees of esterification at lower temperatures, longer times should be used and in general, when the temperature is decreased by 10° the time should be increased by a factor of two.

The water content which can be tolerated in the final organosols is related to the degree of esterification. Thus, in sols of particles having a degree of esterification (DE) of 0 to 2—that is, from 0 to 2 ester groups per square millimicron of particle surface area, the water content can be from 0.2 to 10%, whereas for more highly esterified sols having a degree of esterification from 2 to 4, the water content should be in the range of 0 to 0.2%.

The compositions of this invention, prepared by processes as above described, are silica organosols containing from 10 to 60% by weight of silica as $SiO_2$, the preferred sols containing from 30 to 50% $SiO_2$. They are alkali-stabilized and have $SiO_2:M_2O$ ratios greater than 20D:1 and preferably in the range of 300D:1 to 50D:1, where D is the average particle diameter in millimicrons and $M_2O$ is the alkali expressed as the equivalent basic oxide. The organosols, when adjusted to a silica content of 5% with the polyhydric alcohol constituting the liquid phase of the sol, have a relative viscosity below 1.9 and preferably in the range from 1.1 to 1.4. The organosols are stable in that they show substantially no increase in relative viscosity when aged at 30° C. for one month. Sols prepared with ratios of $SiO_2:M_2O$ greater than 300D:1 have remarkable stability at higher temperatures, in that they show very little increase in relative viscosity in storage for one day at 100° C. When diluted to 10% $SiO_2$ in a mixed solvent containing equal parts of water and polyhydric alcohol the organosols have a pH in the range of 7.0 to 9.0.

The continuous liquid phase in the organosols is a polyhydric alcohol, preferably having two or three hydroxyl groups. Most particularly preferred is ethylene glycol. The silica particles in the organosols are in the form of nonaggregated, amorphous, dense spherical silica particles in the size range of from 5 to 130 millimicrons. The sols have a water content not exceeding about 12% by weight and preferably not exceeding 0.2%. The silica particles can be surface-esterified and have up to 4 ester groups per square millimicron of particle surface area.

For maximum stability the concentration of silica in the organosol is related somewhat to particle size. Thus, the larger the particles, the more concentrated the sols can be with good stability. Sols in which the particles are 100 millimicrons in diameter can be concentrated to 60% $SiO_2$ with good stability. Sols containing particles in the size range of 20 millimicrons can be concentrated to 50% $SiO_2$, whereas sols containing 5 to 10 millimicron particles will ordinarily be less stable above about 40% $SiO_2$. The concentration of silica in organosols can be readily determined by evaporating the organosol to dryness and igniting the residue in air at a temperature of about 1000° C. until constant weight is obtained. The residue is weighed, fumed with sulfuric and hydrofluoric acids, reignited and reweighed, and the loss in weight is calculated as silica. Particularly preferred sols of this invention contain from 30 to 50% silica by weight in the polyhydric alcohol as determined by this technique.

The relative viscosity of the organosol, which as above indicated is an important characteristic, can be measured by diluting the sol to 5% $SiO_2$ with the polyhydric alcohol contained therein, and using an Ostwald pipette the drain time of the solvent and of the 5% silica sol is measured at 30° C. Relative viscosity, $N_r$, is then calculated from the expression:

$$N_r = \frac{dt}{d_g t_g}$$

where $d$ and $t$ are the density and drain time of the silica organosol and $d_g$ and $t_g$ are the density and drain time of the solvent, respectively.

Relative viscosity, as just described, is a prima facie indication of stability, since if the relative viscosity undergoes substantially no increase when the organosols are aged for one month at 30° C. the sols are considered to be stable. Actually the preferred sols of this invention show a slight decrease in viscosity during such aging, the decrease being up to about 10% less than that of the original relative viscosity. Broadly, organosols which show a viscosity change of ±10% of the original viscosity after storage under these conditions are considered to be stable.

The silica organosols are alkali-stabilized as already described. Preferably an alkali selected from the group consisting of sodium hydroxide, lithium hydroxide, and potassium hydroxide is used. The actual $SiO_2:M_2O$ ratio is related to the particle diameter as already indicated. As an example of a preferred case, an organosol containing silica particles in the range of 20 millimicrons is stable at $SiO_2:Na_2O$ ratios in the range from 1000:1 to 6000:1. An organosol containing 5 millimicron particles requires somewhat more alkali, the preferred $SiO_2:Na_2O$ ratio being in the range of from 250:1 to 1500:1. The organosols have a pH in the range from 7.0 to 9.0 and preferably from 7.3 to 8.5. When measuring pH, the sol is diluted to 20% $SiO_2$ with polyhydric alcohol and then with an equal volume of water. The mixture is stirred and the pH recorded only after equilibrium has been established. The alkali content of the organsols can also be determined by diluting one part of the organosol with 10 parts of water and titrating the resulting aqua-organosol to pH 4, using standard acid. From this titer and the silica content of the original organosol, the $SiO_2:M_2O$ ratio is calculated.

The preferred organosols of this invention are colorless and do not contain oxidation products of glycol. The per cent light transmission of silica organosols having particles below 25 millimicrons in size can be determined with a Beckman model Du spectrophotometer and a light wavelength of 400 millimicrons, using the polyhydric alcohol as the reference. The organosols have a percent transmission in the range of from 80 to 100%. In measuring the percent transmission of organosols containing particles larger than 25 millimicrons, compensation is made for the percent transmission of the particles in the organosol. In this case, a synthetic reference can be prepared by mixing a silica aquasol (having a particle size in the same range as the organosol) with glycol in such proportions that the aqua-organosol contains 10% $SiO_2$ and equal quantities of glycol and water. The percent transmission of the organosol is then determined by diluting the organosol with the organic solvent to 20% $SiO_2$ and adding an equal volume of water.

The size of the silica particles in the organosol can be determined directly by electron micrographs. On an electron micrograph print made at 50,000 magnification all of the particles in a given area are counted until about 300 to 400 particles have been measured. The particle size is then the number average of these measured particles. Alternatively particle size can be determined from surface area measurements. The organosol is dried in a vacuum at 110° C. until all of the organic solvent is removed. The surface area of the resulting powder is then determined by nitrogen adsorption. The particle diameter in microns is calculated from the surface area using the relationship:

$$D = \frac{3000}{A_n}$$

where D is the particle diameter in millimicrons, and $A_n$ is the surface area of the product in square meters per gram. Products of this invention contain silica particles in the size range of 5 to 130 millimicrons, and preferably in the range of 10 to 50 millimicrons with 15 to 25 millimicrons being the most preferred range.

The degree of esterification of the silica particles in the organosol can be determined from the dry powder used to measure the introgen surface area as above described. The carbon content of the powder is determined by igniting the sample, collecting and weighing the resulting carbon dioxide. From the carbon content and the surface area in square meters per gram one can calculate the degree of esterification according to the equation:

$$D.E. = \frac{500 \% C}{n \times A_n}$$

where D.E. is the degree of esterification in ester groups per square millimicron, percent C is the percent carbon, $n$ is the number of carbon atoms in the polyhydric alcohol of the organosol, and $A_n$ is the surface area of the silica powder derived from the organosol in square meters per gram.

The organosols of this invention are useful for increasing the soil-resistance of such materials as carpets, upholstery fabrics, wallpaper and painted surfaces, and the like. The products can also be used to advantage as fillers in organic polymers, particularly in the polyester type of polymers such as "Dacron" and "Mylar."

The invention will be better understood by reference to the following illustrative examples:

*Example 1*

Three thousand parts by weight of a silica aquasol containing 30% $SiO_2$ in the form of dense, discrete, amorphous, spherical silica particles, prepared according to the Bechtold and Snyder patent, U.S. 2,574,902, and having a particle diameter of 18 millimicrons, was completely deionized by mixing it with a cation-exchange resin, "Nalcite" HCR, in the hydrogen form, and "Amberlite" IR4B anion-exchange resin in the hydroxyl form. An excess of each of these resins was used, and the deionized sol had a pH of 3.5. After deionization, the resin was separated by filtering, and the resulting deionized sol was alkalized with 1 N sodium hydroxide. This sodium hydroxide solution was added to the deionized sol with vigorous agitation, until the $SiO_2:Na_2O$ ratio was 1500:1.

Four thousand parts by volume of ethylene glycol was then added to the alkalized sol. The pH of this aqua-organosol was 7.0. Water was distilled from this mixture, using a column having an equivalent of about three theoretical plates, while blanketing the distilling mixture with nitrogen. During the distillation, the sol was stirred. About three hours were required to remove most of the water from the distilling mixture, at which time the temperature at the top of the column rose to 185°C. At this point, the reflux ratio was cut to about 10, and during the next three hours of refluxing and distillation the temperature at the top of the column gradually rose to 195° C.

The resulting silica glycol organosol contained 25% $SiO_2$. It had a percent transmission, as measured at 400 millimicrons with a Beckman spectrophotometer, of 88.6, and contained 0.06% water. When diluted to 5% $SiO_2$, and treated with an equal volume of water, the resulting aqua-organosol had a pH of 7.8.

A dry powder was obtained from this organosol by drying it in a vacuum oven at 110° C., until a constant weight was obtained. The dry powder from this organosol had a surface area of 184 m²/g. and a carbon content of 2.83%, corresponding to a degree of esterification of 3.8.

When the organosol was refluxed for 24 hours it showed no change in relative viscosity, and when 1% water was added to the organosol and the mixture refluxed for 24 hours, the relative viscosity rose only 1%.

*Example 2*

A silica aquasol containing 15% $SiO_2$ in the form of 7-millimicron particles was completely deionized. To 200 g. of this sol, 1 N sodium hydroxide solution was added with vigorous agitation until the $SiO_2:Na_2O$ ratio was 400:1. Thereupon 300 mls. of ethylene glycol was added. After addition of glycol, the pH was 7.6. Water was removed from this aquaorganosol by direct distillation, the solids content in the resulting organosol being 11% $SiO_2$. This sol was then concentrated to 25% solids by direct boil-down.

The resulting product had a relative viscosity of 1.19 when diluted to 5% $SiO_2$ with ethylene glycol. The viscosity of this sol was essentially unchanged after storage at room temperature for 2 months.

*Example 3*

A silica aquasol containing 50% $SiO_2$ in the form of 100 millimicron particles was completely deionized by adding mixed anion-cation exchange resin and stirring. The resin was removed by filtration, and the resulting aquasol was treated with 1 N sodium hydroxide until the $SiO_2:Na_2O$ ratio was 5000:1. To one part of this aquasol by weight was added 1.2 parts of ethylene glycol by weight, and the resulting mixture was dehydrated by distillation. The product was a stable silica glycol organosol.

*Example 4*

This example was similar to Example 1, except that lithium hydroxide was used instead of sodium hydroxide. The starting silica aquasol, when deionized and diluted to 10% $SiO_2$, had a relative viscosity of 1.20. It contained 30% $SiO_2$, the silica particles being 20 millimicrons in diameter. After deionization, the sol was treated with 1 N LiOH solution to an $SiO_2:Li_2O$ ratio of 1000, then 2.5 volumes of ethylene glycol for each volume of aquasol was added and the water removed to 0.04% by distillation. The product was finally concentrated to 32% $SiO_2$ by direct boil-down under vacuum. When diluted to 5% $SiO_2$ with ethylene glycol, the organosol had a relative viscosity of 1.1. The sol product had a % transmission of 88. Since the particles were 20 millimicrons in size, it had an $SiO_2:Li_2O$ ratio of 50D:1, i.e., 1000:1.

*Example 5*

A sodium-stabilized silica sol containing 30% silica by weight in the form of particles about fifteen millimicrons in diameter was totally deionized using cation and anion ion-exchange resins. The pH of the deionized silica sol was adjusted to 5.7 with sodium hydroxide solution. To 4166 parts of the above silica sol were added 5833 parts of anhydrous ethylene glycol. The mixture was charged to a batch distillation unit equipped with an agitator in the still pot. The batch was heated at 90 mm. mercury absolute pressure. The first distillate occurred at 50° C. Distillation was continued with the temperature gradually increasing to 136° C. Distillation was continued until the concentration of silica in the residue was 29.5%. The product was very slightly cloudy and was filtered to improve its clarity. The weight of the product was 4350 parts. Analyses of the product indicated 0.03% water. The percent light transmission at 400 millimicron wavelength using ethylene glycol was 99%. The relative viscosity at 5% silica concentration compared to ethylene glycol was 1.8.

In the foregoing examples the invention has been illustrated particularly with reference to ethylene glycol as the polyhydric alcohol. However it will be understood that other polyhydric alcohols, such as propylene glycol and glycerol, can be substituted for the ethylene glycol in the examples and sols of the invention can thus be prepared.

*Example 6*

Following the procedure of Example 3 but substituting propylene glycol for ethylene glycol a stable silica organosol is prepared which can be concentrated to upwards of 10% $SiO_2$ by vacuum distillation.

I claim:

1. A silica organosol, the relative viscosity of which, as measured at 5% $SiO_2$, is in the range of 1.1 to 1.4 and shows substantially no increase upon storage for one month at 30° C., said organosol having a silica content of 30 to 50% $SiO_2$ by weight and comprising substantially non-aggregated, amorphous, dense, spherical silica particles 10 to 25 millimicrons in diameter surface-esterified with up to 2 ester groups of ethylene glycol per square millimicron of surface area and colloidally dispersed in ethylene glycol, the sol being stabilized with enough sodium hydroxide to give an $SiO_2:Na_2O$ mol ratio of from 300D:1 to 50D:1, where D is the average particle diameter in millimicrons, having a pH of 7.3 to 8.5 as measured at 10% $SiO_2$, and containing from 0.2 to 10% water.

2. A silica organosol, the relative viscosity of which, as measured at 5% $SiO_2$, is in the range of 1.1 to 1.4 and shows substantially no increase upon storage for one month at 30° C., said organosol having a silica content of 30 to 50% $SiO_2$ by weight and comprising substantially non-aggregated, amorphous, dense, spherical silica particles 10 to 25 millimicrons in diameter surface-esterified with from 2 to 4 ester groups of ethylene glycol per square millimicron of surface area and colloidally dispersed in ethylene glycol, the sol being stabilized with enough sodium hydroxide to give an $SiO_2$: $Na_2O$ mol ratio of from 300D:1 to 50D:1, where D is the average particle diameter in millimicrons, having a pH of 7.3 to 8.5 as measured at 10% $SiO_2$, and containing up to 0.2% water.

References Cited in the file of this patent

UNITED STATES PATENTS

| | | |
|---|---|---|
| 2,395,880 | Kirk | Mar. 5, 1946 |
| 2,574,902 | Bechtold et al. | Nov. 13, 1951 |
| 2,635,056 | Powers | Apr. 14, 1953 |
| 2,657,149 | Iler | Oct. 27, 1953 |
| 2,739,076 | Iler | Mar. 20, 1956 |
| 2,739,078 | Broge | Mar. 20, 1956 |
| 2,780,168 | Nichols | Feb. 5, 1957 |

FOREIGN PATENTS

| | | |
|---|---|---|
| 611,914 | Great Britain | Nov. 5, 1948 |

OTHER REFERENCES

Synthetic Organic Chemicals—Carbon and Carbide Chemicals Co., 1952, pp. 43 and 46.